March 21, 1961 C. E. GRINSTEAD 2,976,466
SHIELDING DEVICE
Filed Sept. 8, 1958
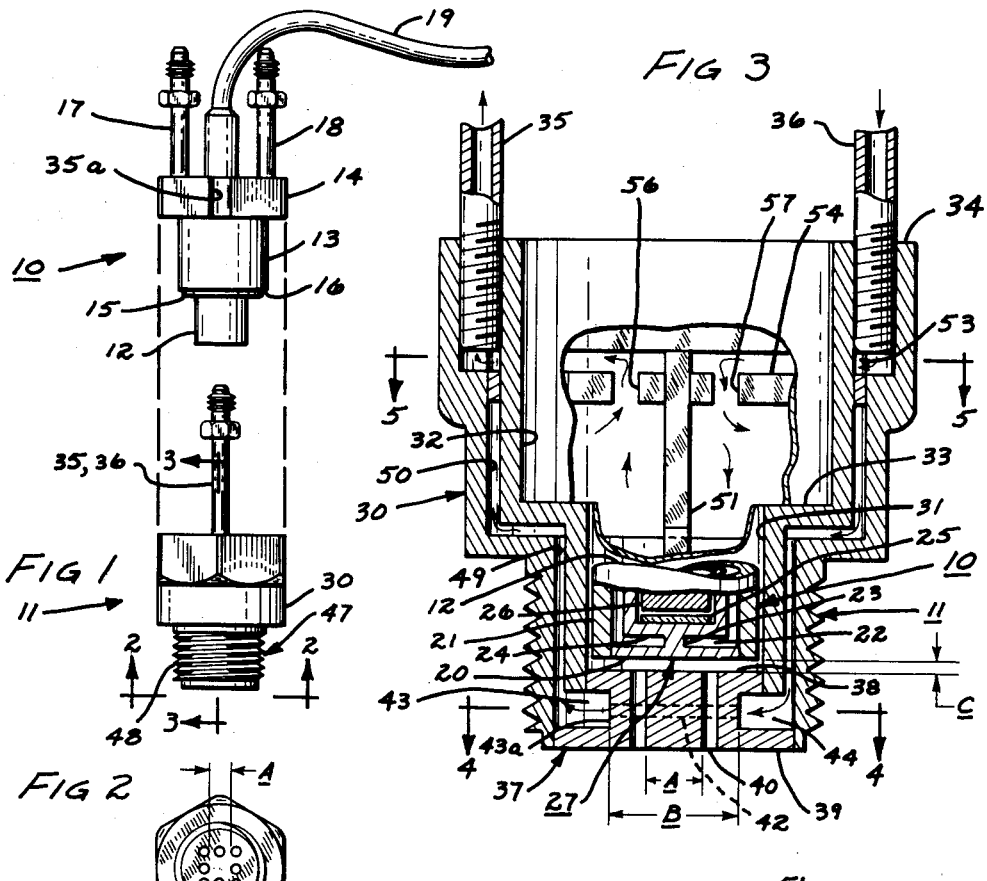
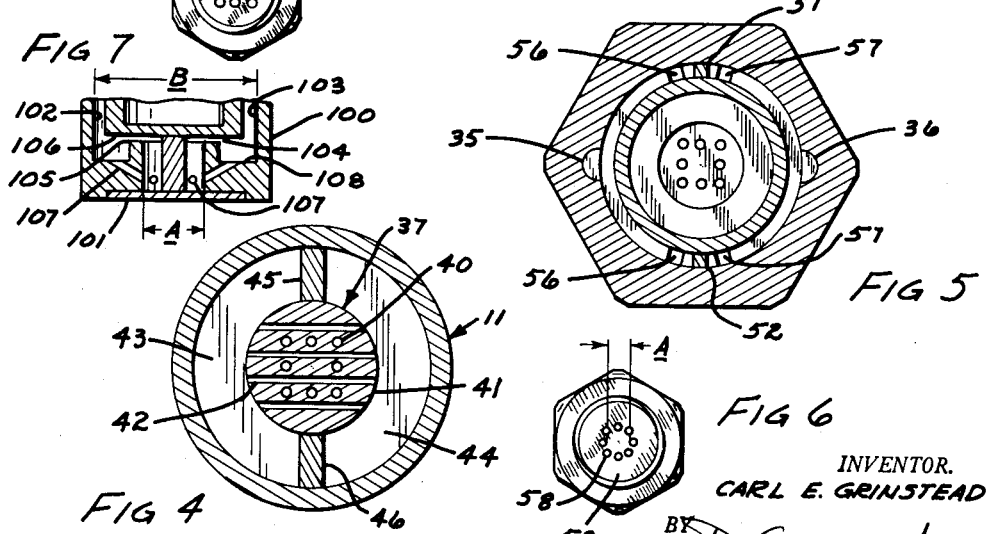
INVENTOR.
CARL E. GRINSTEAD
BY D. Gordon Angus
ATTORNEY.

United States Patent Office 2,976,466
Patented Mar. 21, 1961

2,976,466

SHIELDING DEVICE

Carl E. Grinstead, 386 Crosby Ave., Altadena, Calif.

Filed Sept. 8, 1958, Ser. No. 759,481

12 Claims. (Cl. 317—246)

This invention relates to pressure measuring devices, and in particular to a transducer of the type in which a flexible diaphragm is deflected by pressure being measured in order to provide an indication of the magnitude of the pressure.

Transducers of the above type are well known, one such device, with which this invention is particularly useful, is shown in applicant's co-pending application Serial Number 531,485, filed August 30, 1955, entitled "Pressure Indicator," and now Patent No. 2,896,138.

Speaking generally, these transducers operate by exposing a diaphragm to a pressure to be measured. The diaphragm deflects at its center by an amount which is proportional to the pressure, thereby providing a means for measuring the pressure. The diaphragm is ordinarily formed as one plate of a condenser, the other plate being relatively rigidly mounted, and not exposed to the pressure being measured. The spacing between the two plates is changed when the diaphragm deflects, and the resulting change in capacity of the condenser is varied proportionally to the pressure change, so that read-out means which are responsive to the capacity change can be calibrated in terms of pressure.

It is evident that the accuracy of the pressure reading depends very directly upon whether the diaphragm deflects solely as a function of pressure. In the event that other physical phenomena also act upon the diaphragm so as to deflect or distort it, then the actual reading will not reflect just the pressure effect, but instead a combination of that and other effects so that the indicated measurement has at least a serious error, and at worst (which often occurs) can produce a reading in which a pressure change may be entirely masked out by the other effects.

Numerous efforts have been made to isolate the pressure-sensitive diaphragm from all effects except that of pressure. For example, in the aforesaid co-pending application, it was attempted to isolate the pressure-sensitive diaphragm from the effects of mechanical shock in the body to which the device was mounted, and also from mechanical stresses resulting when the body is heated up, and from stresses resulting from tightening the device into a threaded port.

Because deflection of a diaphragm in response to pressure change is fundamentally a direct function of differential pressure applied across it, the inaccurate pressure readings obtained by the use of presently known diaphragm-type transducers have long been a source of dissatisfaction. The device shown in the aforesaid patent application has reduced the errors of readings to about a tenth of the magnitude of errors resulting from the use of conventional diaphragm transducers. The device of this invention has been found to reduce errors in readings obtained from the transducer shown in the said patent application to about a tenth of the errors obtained by using that transducer alone. This is an overall reduction of errors to about one-hundredth of the magnitude resulting from the use of conventional transducers alone. It has also been found that this shield improves the accuracy of conventional transducers, although that combination does not secure the optimum improvement.

This improvement has many important corollaries, because now it is possible to use a ruggeder, less responsive transducer device and still get a reading of greatly increased accuracy. Manufacturing tolerances are relieved, wider pressure ranges can be withstood by the same transducer, and greater safety factors can be built into the transducer to resist large peak loads, all while obtaining better accuracies than could be obtained before.

The source of this particular improvement is the elimination of the effects of impingement of radiant-energy on the diaphragm. Radiant energy, such as is emitted by a flame or a flashbulb, comprises a wave capable of producing very high instantaneous temperatures. It has been found, for example, that a common photographic flashbulb produces an instantaneous temperature in the neighborhood of 2,000°–4,000° F. When a flashbulb is set off near a diaphragm-type device such as shown in the aforesaid patent application, a pressure reading results, even though no actual change in fluid pressure is caused by the light waves. It is theorized that the outer molecular layers of the diaphragm are heated up by the radiant energy and that this effect buckles the diaphragm enough to produce a reading. When the present invention is used, in which radiant energy does not reach the diaphragm, but pressure waves do, there is no pressure reading at the firing of a flashbulb.

Accordingly, an object of this invention is to provide a means for shielding the diaphragm of a pressure-sensitive device from radiant energy while still exposing it to pressure.

This invention is carried out by providing a body having an opening for receiving a pressure-responsive device. A shield extends across the opening, the shield having an inner and an outer face. The inner face is toward, and spaced from, the pressure-responsive diaphragm, and the outer face is exposed to pressures to be measured. Passages extend between the inner and outer faces for conducting fluid pressure to the diaphragm.

A feature of this invention resides in spacing apart the passages so as to leave imperforate the portion of the shield which is directly opposed to the area of the diaphragm which undergoes substantial deflection in response to pressure change.

An optional feature of this invention resides in providing coolant passages through the shield for cooling the same when it is exposed to high temperatures.

The above and other features of this invention will be fully understood from the following detailed description and the accompanying drawings, of which:

Fig. 1 is an exploded elevation of a transducer and a shield device according to this invention;

Fig. 2 is a bottom view taken at line 2—2 of Fig. 1;

Fig. 3 is a view, partly in cross-section, taken at line 3—3 of Fig. 1;

Figs. 4 and 5 are cross-sections taken at lines 4—4 and 5—5, respectively, of Fig. 3;

Fig. 6 is a bottom view of an alternate embodiment of a shield device according to the invention; and Fig. 7 is a fragmentary cross-section view of an alternate embodiment of a transducer useful with this invention.

Fig. 1 is an exploded view which illustrates the physical relationship between a transducer 10 and a shield device 11 according to the invention. Full details of the transducer can be found in the aforesaid co-pending application, Serial Number 531,485. Briefly, it includes a lower nose section 12, a central body section 13, and a flange section 14. A gasket 15 rests on a shoulder 16 at the junction of the nose section and the body section. Coolant connections 17 and 18 are provided for supplying coolant to the transducer. A cable 19 connects a condenser arrangement in the transducer with a read-out device (not shown).

Fig. 3 shows a part of the nose section 12 in cross-section. The lower surface of the nose section forms a first diaphragm 20 which is attached at its edges to the side wall 21 of the nose section. A groove 22 is cut radially inward to leave a central post 23 which interconnects the center of first diaphragm 20 to the center of a second diaphragm 24. Reflection of diaphragm 20 is transmitted to diaphragm 24 by post 23. A sheet 25 of mica or other insulating material is placed between the second diaphragm, which is one plate of the condenser arrangement, and an electrode foot 26, which is the other plate. There is also a small air space between the diaphragm and the foot to enable relative movement to occur between them; that is, the thickness of the mica is less than the spacing between the second diaphragm and the foot. This mica or other insulating material is used to increase the initial capacity of the condenser, and also increases the sensitivity of the instrument to small changes in pressure.

A central portion 27 of diaphragm 20 is the part of the diaphragm that deflects substantially when pressure is applied thereto. This central portion has a diameter indicated in Fig. 3 by the letter A. The region of the diaphragm outside the central portion 27 does not substantially deflect. This is because the outer portion is edge-mounted to the wall of the nose section, and therefore its deflection is very small compared to that of the central portion.

It has been found that exertion of physical forces such as radiant energy and the like on the annular portion of diaphragm 20 which lies outside the central region, that is between the diameter A and B, is insignificant. It has also been found that impingement of radiant energy on the central portion within the diameter A does result in a significant deflection of diaphragm 20, even though there may be no pressure change. Accordingly, the shield device 11 is provided with means for simultaneously exposing the central portion of diaphragm 20 to pressure variations, while shielding that portion from radiant energy.

A fluid-cooled shield device 11 for this purpose is shown in detail in Fig. 3. The device, which also acts as a mount, comprises a body 30 which has an opening 31 with an enlarged bore 32 at the upper end of said opening. A shoulder 33 is provided at the intersection of the bore 31 and the lower portion of the opening.

The transducer 10 fits within said opening, with its nose section 12 in the lower part of opening 31 and its central section 13 in the enlarged bore 32. The gasket 15 supports the shoulder 16 from the shoulder 33 and makes a gas-tight seal between the transducer and the shield device. There is a small clearance of the order of 0.002" between the nose section of the transducer and the inner wall of the opening 31. The body section of the transducer may be spaced from or be in contact with the wall of the enlarged bore 32. The flange section 14 rests on the upper end 34 of the mount.

Coolant conduits 35, 36 fit in grooves 35a in the flange section of the transducer, and screws or other fasteners (not shown) may be provided to hold the transducer tightly onto the shield device. The fasteners may extend through the flange section of the transducer into the upper end 34 of the shield device.

The lower end of the opening is closed by a shield 37. This shield comprises a plate which has an inner face 38 and an outer face 39. The inner face 38 faces the lower surface of diaphragm 20, and is spaced therefrom by a distance marked dimension C in the drawings. The magnitude of this dimension will be discussed below. Eight passages 40 pierce the shield 37 from face to face. As best seen in Fig. 2 these passages lie outside of the central region which has the diameter A. The central portion 41 of the shield 37 is imperforate and this imperforate portion is directly, axially, opposite the central portion of diaphragm 20. It will be seen that none of passages 40 overlaps the central portion of diaphragm 20.

Transverse cooling ports 42 are drilled across the plate so as to interconnect diametrically opposite segments 43, 44 of a peripheral groove 43a. The two segments are formed by turning a continuous groove (see Fig. 4) 43a in the shield, and then installing blocks 45, 46 diametrically opposite from each other so as to divide the groove into the two segments as shown. The transverse cooling ports 42 pass between aligned rows of passages 40 which is the reason that the square pattern of passages was provided.

The lower portion 47 of the shield device may be provided with external threads 48 so that it can be turned into a thread-tapped port if desired. Inside this lower portion there is an annular spacing 49 which is divided into two segments by continuations of the blocks 45 and 46. The shield is brazed to the lower portion of the mount in the manner shown. This annular spacing connects with an annular spacing 50 at a medial point of the body, annular spacing 50 being divided into two portions by blocks 51, 52 (see Fig. 5). An internal annular groove 53 is separated from the annular spacing 50 by a ring 54 and is also divided into segments by blocks 51 and 52.

Groove 53 communicates with the coolant tubes 35 and 36, the tubes being on opposite sides of the blocks 51, 52. Coolant enters or leaves the coolant tubes 35 and 36 and flows through the groove 53 to openings 56, 57 on opposite sides of the blocks 51, 52 from which it flows into opposite sides of the spacing 50 down through the spacing 49 into the segments 43 or 44, through the transverse cooling ports 42 and symmetrically out through the rest of the system. This provides for cooling of the body and of the shield.

When pressure is being measured in a system wherein high temperatures are not encountered, such as in microphone installations, it is unnecessary to provide for cooling, and while the shield device shown in Fig. 3 could be used in such circumstances, it is often desirable to provide a less expensive, less complicated mount without the cooling features. In this case, the valve coolant connections and annular spaces and grooves would not be provided. Then the circular pattern of passages 58 shown in Fig. 6 could be used, these passages being provided in a shield 59 having the general orientation to the rest of the structure as shield 57 in Fig. 3. All of these holes remain outside the central area of the diaphragm 20, but there is the advantage that all of them lie immediately adjacent to this central section instead of having the four corner passages spaced outward from diameter as was necessary when transverse cooling ports had to be drilled between the passages.

In constructing the shield device of this invention, certain relative dimensions must be carefully attended to. These are the spacing of the lower surface of diaphragm 20 from the upper, inner, face 38 of shield 37, the thickness of the shield 37, and the diameter of passages 40. The actual dimensions must be empirically determined for each size of diaphragm (remaining the same for other diaphragms of the same dimensions), so as to give an acoustic path and internal chamber in which the true pressure being measured will be exerted on the diaphragm.

One limiting condition is that the face 38 must not be so close to the diaphragm that there is a dampening effect which tends to damp-out the pressure waves. Ordinarily, and for most practical devices, this means that the spacing between diaphragm 20 and the inner face 38 should not be less than about 0.001". On the other hand, it is also necessary to avoid constructing a resonant chamber which would operate as a Helmholtz generator, which would produce spurious signals having a frequency within the frequency range which is of interest and being measured. A range of practical importance lies between 5,000 and 10,000 c.p.s. The term "Helmholtz generator" is a well known one referring to a resonant cavity. It has been found that in order to avoid this effect, in most presently important ranges, and particularly those below 10,000 c.p.s., the spacing between the diaphragm and the inner face of the shield should not greatly exceed 0.003". In fact it is preferably just about 0.003" for a diaphragm having a one-half inch diameter.

The passages 40 form part of the acoustic path to the diaphragm, and their dimensions should be large enough to permit the pressure impulses to reach the diaphragm substantially unattenuated. The shield should also be thick enough that not much heat from conduction reaches the diaphragm. Actually, there is very little fluid flow through passages 40, and if the shield is of appreciable thickness, the desired isolation of the diaphragm from conducted heat is obtained. Also, the ratio of passage length to passage diameter should be such that radiant energy cannot impinge on the diaphragm by taking a slanting path.

A suitable arrangement is as follows:

$A = \frac{1}{16}"$—Diameter of passages $40 = 0.0625"$.
$B = \frac{1}{8}"$—Thickness of shield $37 = 0.125"$.

These relationships are all empirical, and require certain trial-and-error experimentation inasmuch as there is no known invariable relationship between all of the parameters. Furthermore, the dimensions will vary slightly depending on the frequency with which the device is to be used. The above dimensions have been found suitable for a device in which pressure frequencies of the order extending between zero (static pressure) and 10,000 cycles per second are to be measured.

The cooled device, shown in Figs. 1–5, is preferably utilized in installations where it is to be exposed to hot gases for a considerable time so that heat transfer to the transducer becomes a problem, and the device must be cooled. The cooling prevents warpage or other heat damage to the device. It has been found that with this cooled embodiment there is no detectable change of pressure readings when the temperature of the fluids bearing on the diaphragm is changed, and their pressure is held constant.

The non-cooled embodiment of Fig. 6 is useful in certain installations where heat transfer is no particular problem, such as where there is a sudden transient temperature rise which lasts such a short time that any temperature change in the transducer is negligible.

This shield device for the diaphragms, by its technique of isolating the diaphragm from the effect of radiant energy in a manner which does not interfere with the actual transmission of the pressure variations to the diaphragm results in a pressure transducer system having an accuracy which is much better than has been previously attainable. As stated before, it is now possible, while increasing the accuracy of response, to decrease the sensitivity of a given transducer. Therefore, it is at once possible to improve the accuracy of the reading while utilizing a more rugged, less sensitive device which is capable of withstanding wider ranges and higher peak loads without damage. The consequences of such an arrangement are obvious, and it is still possible, if it is desired to attain the maximum accuracy possible, to utilize the most sensitive type of pressure-responsive transducer in connection with the shield device of this invention to achieve all of the potential improved performance.

Still another example of a transducer with which this shield is useable is shown in Fig. 7. Only its diaphragm configuration differs from that in Figs. 1 and 2. The outer body 100 is shown to which a thin outer diaphragm 101 is brazed. Coolant passages 102 and 103 communicate through a gap 104 between a step 105 on the body and an inner diaphragm 106. Also, passages 107 communicate between the coolant passages and the region between the inner and outer diaphragm. Note that the internal shoulder 108 which carries step 105 forms an outer part of the outer diaphragm. The thin inner part numbered 101 is a more flexible element. Shoulder 108 does not appreciably deflect. Its outer diameter is designated as B. The inner part, having a diameter designated as A, undergoes substantially all the deflection. It is the thin part of the outer diaphragm 101, with the diameter A, which is shielded from radiant energy by the shield device.

This shield device, while useful with any type of transducer which includes a pressure-responsive diaphragm, is particularly suited for use in connection with the transducer shown in Figs. 1 and 2 and described in the aforesaid co-pending application, because a resulting combination is attained which is substantially insensitive to temperature effects, radiant energy effects, and to mechanical shock and thermal shock effects. The combination provides a measuring device having a magnitude of accuracy which has not heretofore been attainable with any known instrumentation device of this rugged character.

This invention is not to be limited by the embodiments shown in the drawings and described in the description, which are given by way of illustration and not of limitation, but only in accordance with the scope of the appended claims.

I claim:

1. In combination with a pressure measuring device having a diaphragm adapted to be exposed to pressure variations in a fluid, the diaphragm having a central area which undergoes substantial deflection in response to fluid pressure exerted on said diaphragm so as to provide an indication of the magnitude of the pressure, a shield device for said diaphragm comprising a body having an opening for receiving the device, and a shield having a planar inner face and an outer face, said shield extending across the opening with its inner face parallel to and facing toward the said diaphragm and spaced therefrom to form a chamber, the inner sidewall of said chamber formed by the body being imperforate, and the outer face of the shield facing toward the pressure being measured, said shield having a plurality of passages which extend from face to face, said passages being spaced from one another and lying outside a region which is directly opposed to said area leaving an imperforate portion of material impervious to radiant energy therebetween, and the perforations lying inside the region defined by the inner sidewall of the body, whereby the imperforate portion of the shield acts as a baffle to protect the area from direct impingement of radiant energy, the passages providing means for fluid communication between the outer and inner face whereby the fluid contacts the diaphragm so as to exert its pressure thereon.

2. Apparatus according to claim 1 in which said passages lie on a square.

3. Apparatus according to claim 1 in which said passages lie on a circle.

4. Apparatus according to claim 1 in which means are provided for cooling said shield.

5. Apparatus according to claim 1 in which the inner face of the shield is spaced from the diaphragm by a distance less than that in which the volume between them would constitute a Helmholtz resonator which generates spurious frequencies within the range being measured, and greater than that in which the said volume substantially dampens pressure fluctuations.

6. Apparatus according to claim 1 in which said passages are holes which are substantially normal to the diaphragm.

7. In combination with a pressure measuring device having a diaphragm adapted to be exposed to pressure variations in a fluid, the diaphragm having a central area which undergoes substantial deflection in response to fluid pressure exerted on said diaphragm so as to provide an indication of the magnitude of the pressure, a shield device for said diaphragm comprising a body having an opening for receiving the device, and a shield having an inner face and an outer face, said shield extending across the opening with its inner face toward the said diaphragm and spaced therefrom, and its outer face toward the pressure being measured, said shield having a plurality of passages which extend from face to face, said passages being spaced from one another and lying outside a region which is directly opposed to said area leaving an imperforate portion of material impervious to radiant energy therebetween, said body having a wall surrounding said opening, a first peripheral passage in said wall, two blocks in said peripheral passage which divide said passage into two segments, a coolant inlet connecting with one of said segments, a coolant outlet connecting with the other of said segments, and a second peripheral passage in said wall communicating with said shield, a pair of blocks dividing the second peripheral passage into two segments, each of said latter segments communicating with only one of the first-named segments, the wall having passages angularly spaced from the inlet and outlet conduits for interconnecting said segments, the shield having transverse ports interconnecting the said last-named segments, whereby the imperforate portion of the shield acts as a baffle to protect the area from direct impingement of radiant energy, the passages providing means for fluid communication between the outer and inner face whereby the fluid contacts the diaphragm so as to exert its pressure thereon.

8. Apparatus according to claim 7 in which said passages are formed in rows, said ports passing between said rows.

9. Apparatus according to claim 7 in which said passages are holes which are substantially normal to the diaphragm.

10. Apparatus according to claim 7 in which the inner face of the shield is spaced from the diaphragm by a distance less than that in which the volume between them would constitute a Helmholtz resonator which generates spurious frequencies within the range being measured, and greater than that in which the said volume substantially dampens pressure fluctuations.

11. Apparatus according to claim 10 in which the passages lie on a square.

12. Apparatus according to claim 11 in which the said area is about one-sixth inch in diameter, the spacing between the inner face and the diaphragm is about 0.003", and in which the passages are about 0.0625" diameter, and the shield is about 0.125" thick.

References Cited in the file of this patent

UNITED STATES PATENTS

| | | |
|---|---|---|
| 2,266,315 | Frawley | Dec. 16, 1941 |
| 2,345,071 | Reynst | Mar. 28, 1944 |
| 2,674,049 | James | Apr. 6, 1954 |